Nov. 2, 1926.

N. N. SMITH

DOUGHNUT MACHINE

Filed Oct. 31, 1925

INVENTOR
NEWELL N. SMITH
BY
ATTORNEY

Nov. 2, 1926.

N. N. SMITH

DOUGHNUT MACHINE

Filed Oct. 31, 1925

INVENTOR
NEWELL N. SMITH
BY
ATTORNEY

Patented Nov. 2, 1926.

1,605,476

UNITED STATES PATENT OFFICE.

NEWELL N. SMITH, OF LOS ANGELES, CALIFORNIA, ASSIGNOR TO DAVIS STANDARD BREAD COMPANY, A CORPORATION OF CALIFORNIA.

DOUGHNUT MACHINE.

Application filed October 31, 1925. Serial No. 65,990.

Although my present invention is referred to as a doughnut machine, I may state, at the outset, that this invention relates not only to an effective general organization for the purpose above indicated, but also, and more particularly, to certain novel features of construction and operation hereinafter described as designed for use respectively near the "feed" end of a doughnut machine (comprising a vat of hot grease) and at an intermediate point therein; and the especial objects of my invention include the provision of doughnut cooking vats (which may contain any preferred fat or oil or mixture kept at an elevated temperature, and hereinafter referred to merely as "cooking grease") with handling means comprising (1) transverse bars or tubular members and means for gradually advancing the same from the feed end of a vat toward the delivery end thereof, (2) means for initially supporting the introduced units of doughnut dough, or the like, above the bottom of the mentioned vat and at a level and in a manner assuring their advance (regardless of their initial buoyancy or lack of buoyancy) with the mentioned transverse advancing members, and (3) means for automatically and reliably turning said doughnuts, or the like, at an intermediate point in their travel.

Other objects of my invention, including the provision of a novel method of cooking doughnuts by the use of devices such as are above mentioned, and including the provision of a general organization incorporating the mentioned features, together with additional novel details (such as a special friction drive etc.) may be best understood from the following description of an illustrative embodiment of my invention, taken in connection with the appended claims and the accompanying drawings, in which Fig. 1 is a longitudinal vertical section through an organization illustrating my invention, but with feeding means and heating means (in which there need be no novelty) not shown.

Figure 1:
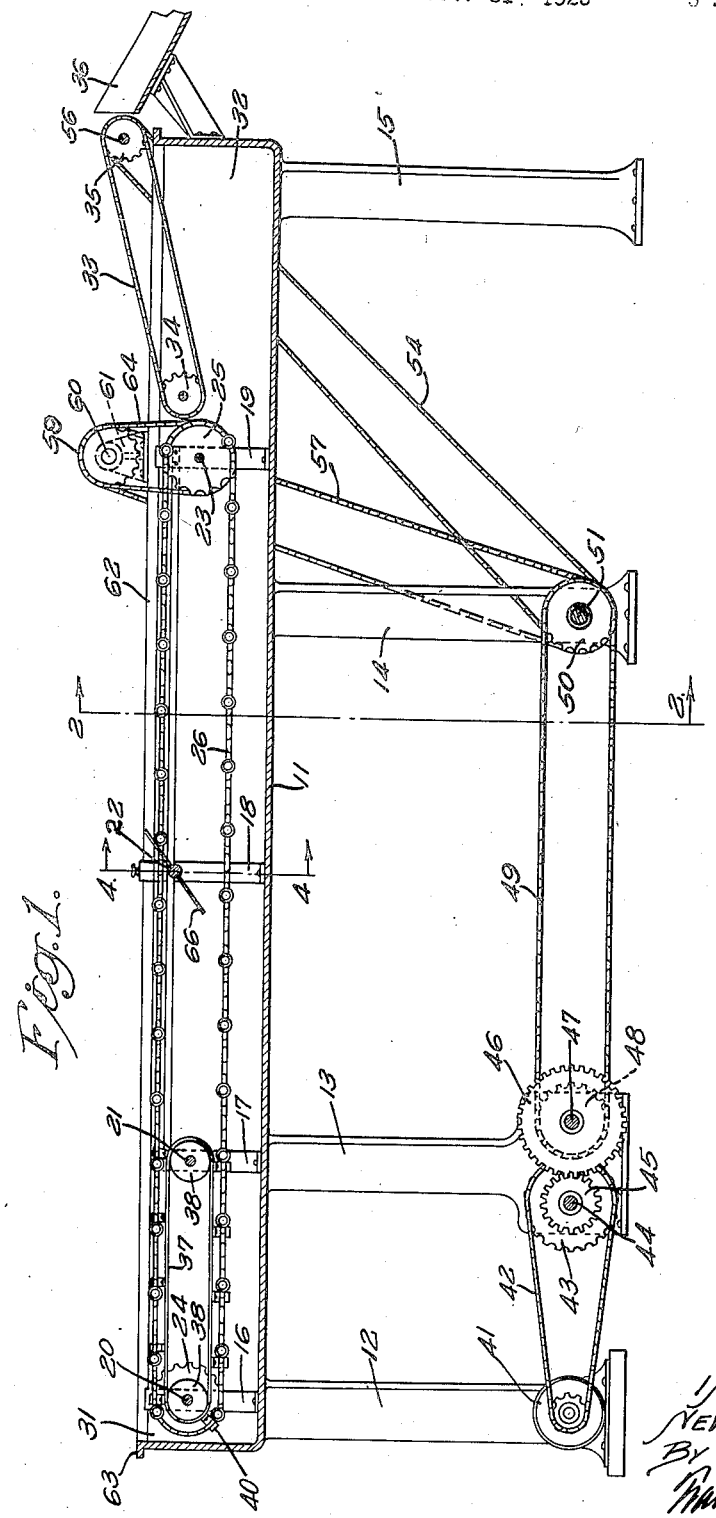
Figure 2:
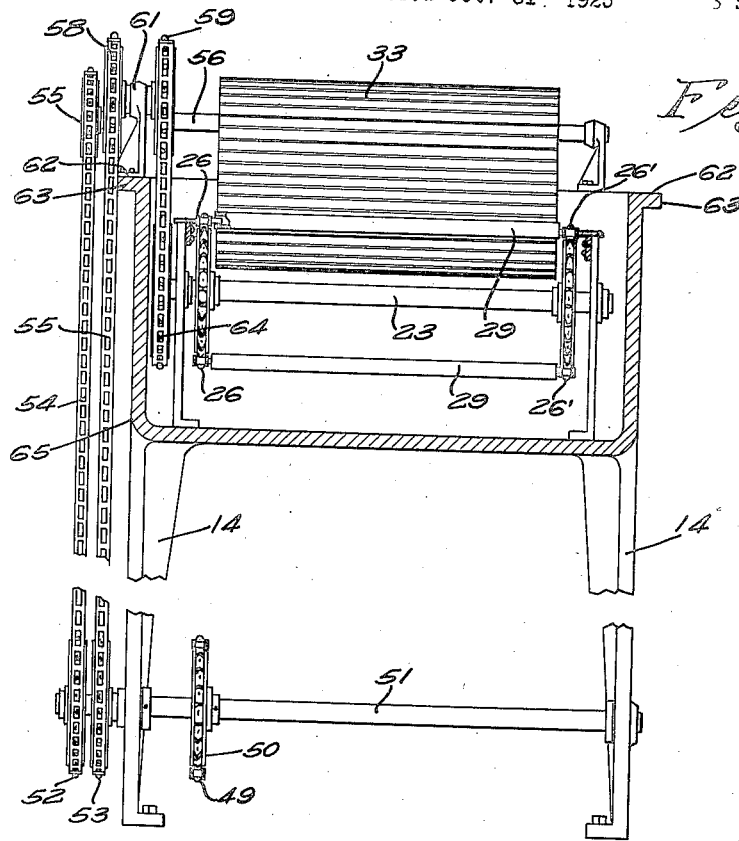
Fig. 2 is a transverse vertical section, on a slightly enlarged scale, in substantially the plane indicated by the line 2—2 of Fig. 1, but with parts broken away.

Referring to the details of that specific embodiment of my invention chosen for purposes of illustration, 11 may be a vat adapted to contain hot cooking grease (burners for the heating of the same being omitted as irrelevant to my present invention). This vat is shown as supported by or integral with legs 12, 13, 14 and 15—all or some of which may be utilized to provide bearings for drive transmission members hereinafter referred to; and the vat 11 is shown as provided interiorly with subsidiary frame elements 16, 17, 18 and 19, adapted to provide bearings for horizontal shafts 20, 21, 22 and 23,—the first and last of these horizontal shafts being used for the support of pairs of sprocket wheels 24 and 25, disposed near the respective ends of said shafts and adapted to carry separate sprocket chains 26, 26'.

Some of the links of these sprocket chains, as the links 27, may be provided with means such as inwardly projecting pins 28, adapted to support transversely extending rods or tubes 29, shown (see Fig. 3) as advancing longitudinally of the vat 11 at approximately the level of the upper surface of the contained grease 30.

It will be obvious that any buoyant objects, such as doughnuts which have become light as a result of contact with the hot grease, must be pushed from the feed end 31 of a cooking vat of the general character described toward the delivery end 32 thereof,—this being shown as provided with a delivery conveyor or apron 33, advancing over sprockets 34 and 35 and adapted to drop cooked doughnuts, or the like, into a delivery chute 36.

Figure 3:
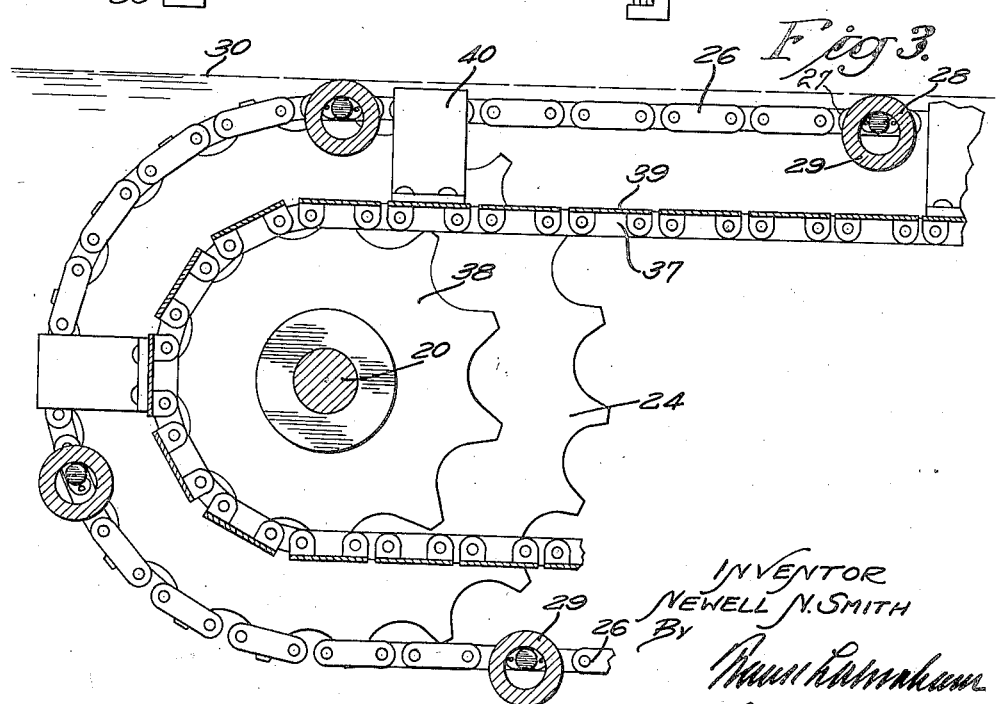
Fig. 3 is an enlarged detail view corresponding to the upper left-hand portion of Fig. 1.

One of the important features of my invention being the provision of means to support and to assure an engagement of all doughnuts, or the like, which may be fed into the end 31 of the vat 11, or its equivalent, by transverse advancing members such as the tubes 29, I may utilize the rotation of the shaft 20, or its equivalent, or the advance of the transverse elements 29 themselves, as best shown in Fig. 3, correspondingly to advance a submerged "endless" member 37. This member is adapted to prevent introduced units, formed of doughnut dough or the like, from dropping out of reach of the advancing members 29, or their equivalents. I may mount rollers or sprocket wheels 38 upon the shafts 20 and 21, carrying thereover an "endless" web or "endless" sprocket chains supporting not only transverse plates 39 but outwardly projecting lugs 40,—the latter being engageable by the transverse advancing members 29, and the former being adapted to support and advance the mentioned food units during periods sufficient partially to expand the same,—thereby assuring such bouyancy as to insure their engagement by the members 29 and their further advance therewith.

I may support a motor 41 in any convenient manner, carrying power therefrom, as by a sprocket chain 42, to a sprocket wheel 43, the shaft 44 of the latter being shown as provided also with a gear 45. The last mentioned gear is adapted to engage a larger gear 46, which is shown as mounted upon a shaft 47; and this shaft may carry also a sprocket gear 48, adapted to impart rotation, as by means of a chain 49 and a sprocket gear 50, to a shaft 51,—the shafts 44 and 47 being shown as supported between legs 13, and the shafts 51 being shown as provided with bearings in legs 14. Externally of the legs 13, the shaft 51 may be provided with additional sprockets 52 and 53, one of which may advance a sprocket chain 54, extending over a sprocket 55 on a shaft 56, which carries the mentioned sprocket gear 35 (to advance the delivery apron 33) the companion sprocket wheel 53 being employed to cause the advance of the transverse tubular elements 29, or their equivalents, as by means of a sprocket chain 57, shown as carried on a short shaft engaging one of a pair of sprocket wheels 58, 59,—both of which may be rigidly secured upon a short shaft 60. The last mentioned shaft is shown as supported by a bracket 61 resting upon the upper surface 62 of a flange 63, which may extend about the top of the vat 11; and the sprocket 59 is shown as advancing a chain 64, which passes also around a sprocket 65 upon one end of the shaft 23, which carries the mentioned sprocket 25,— adapted to advance the transverse tubular elements 29.

Figure 4:
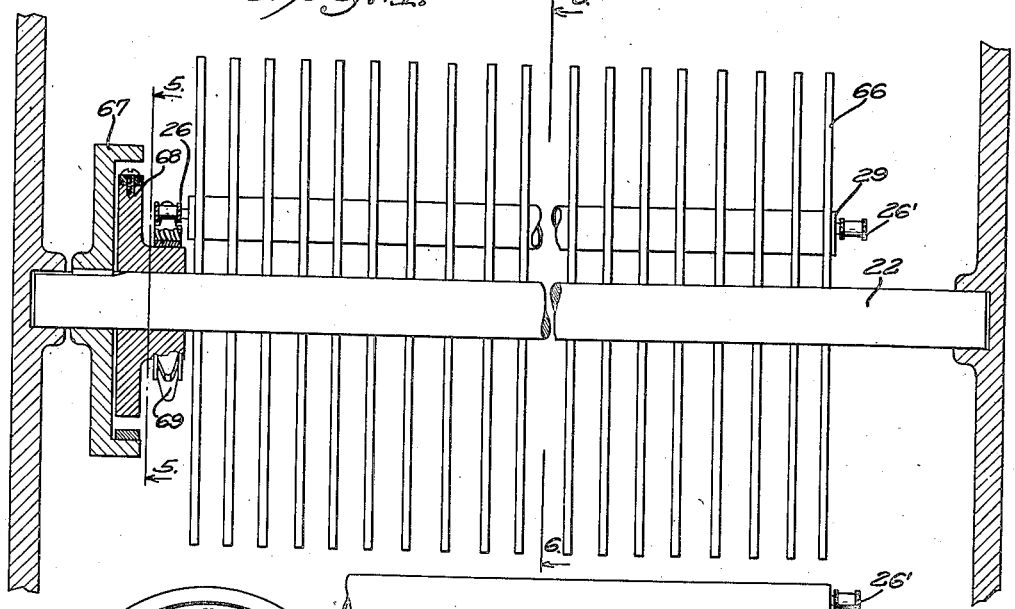
Fig. 4 is a similarly enlarged detail view, taken substantially as indicated by the line 4—4 of Fig. 1, but with parts broken away.
Figure 5:
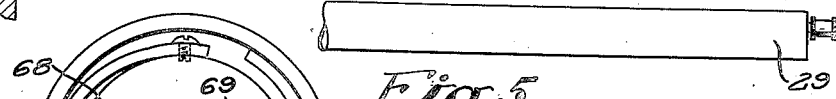
Fig. 5 is a vertical section taken substantially as indicated by the line 5—5 of Fig. 4.
Figure 6:
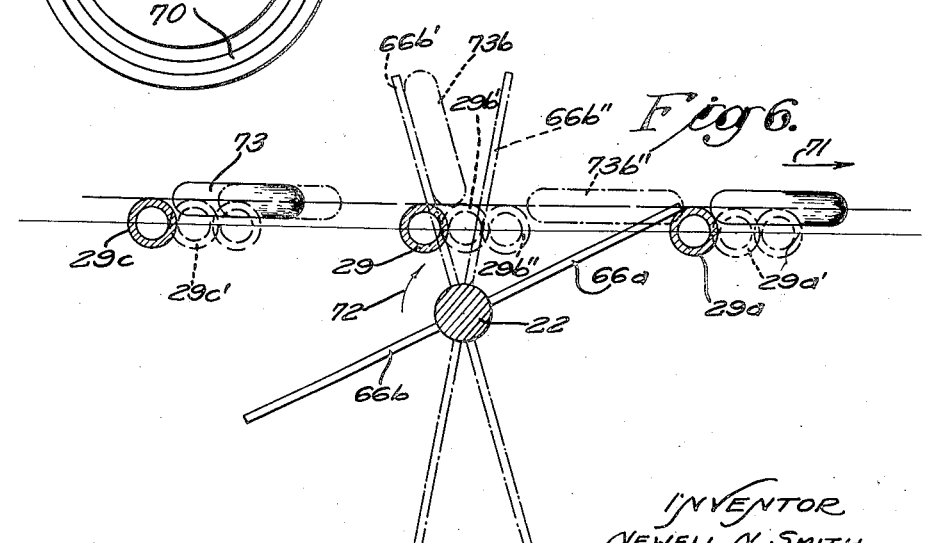
Fig. 6 is a diagrammatic detail view (which may be regarded as taken in a plane such as is indicated by the line 6—6 of Fig. 4) to illustrate a mode of operation hereinafter described.

For the purpose of turning doughnuts, or the like, at an intermediate point in their travel between the feed end and the delivery end of a vat of any suitable configuration, I prefer to employ unique means of the general character best shown in Figs. 4, 5 and 6, securing the mentioned shaft 22 at a somewhat higher elevation than the shafts 20 and 23 (respectively carrying sprocket wheels 24 and 25 for the chains, 26, 26') by which the transverse tubular elements 29, or their equivalents, are advanced. I provide this shaft 22 with means such as parallel fingers 66, shown as projecting radially therefrom or extending transversely therethrough and as adapted to rise, in the course of their rotation, into the path of the tubular members 29, or their equivalents, and considerably above the surface of the cooking grease,—substantially as shown diagrammatically in Fig. 6. To impart rotation to the shaft 22 while permitting variations in the rate of rotation thereof, I prefer to employ means of the general character illustrated in Figs. 4 and 5 as comprising a drum 67, shown as keyed on the shaft 22, and a disc 68, revoluble upon said shaft and integral with a sprocket wheel 69,—said sprocket wheel being engageable by one of the chains 26, 26', and said disc being provided with means such as a comparatively stiff spiral spring 70, to serve as a friction driving connection permitting slippage between said disc and said drum.

Not only the elevation of the shaft 22 but the length of the fingers 66 and the intervals between the transverse elements 29 are required to be carefully proportioned in order to secure the desired mode of operation, illustrated in Fig. 6. In this figure, three transverse elements—$29^a$, $29^b$ and $29^c$—are assumed to be advancing in the general direction of the arrow 71, while the shaft 22 is rotated, as by a friction drive of the general character referred to, in the direction of the arrow 72; and the uniform interval between the transverse doughnut-advancing members referred to is such that, at that moment when one set of turning fingers, as the fingers $66^a$ (which may be assumed to be pressing, although without appreciable effect, against the transverse member $29^a$ during its advance) are released from contact therewith, and thereby permitted to swing rapidly downward, the fingers $66^b$, rising at a corresponding rate beneath a doughnut 73, may clear the transverse element $29^c$ and lift this doughnut, the fingers $66^b$ thus advancing to the position $66^{b'}$, and giving said doughnut an elevated position (such as is shown at $73^b$) in which it stands upon the intermediate transverse element $29^b$ (which at this time occupies the position $29^{b'}$—which is simultaneous with the position $29^{c'}$ of the transverse element $29^c$ and with the position $29^{a'}$ of the transverse element $29^a$).

From their moment of contact with the transverse element $29^b$, the fingers $66^b$ are able to advance only at the rate permitted by the movement of the chains 26, 26'; but, after the fingers $66^b$ reach a position such as that indicated at $66^{b''}$ (as by the advance of the transverse element 29$^b$ to the position 29$^{b''}$) the doughnut 73 is automatically tumbled forward into such a position as 73$^{b''}$,—being thus turned over and placed in advance of the transverse element 29$^b$—which was originally one step ahead of the transverse element 29$^c$, by which the movement of this doughnut was previously controlled, (the advance of the transverse elements being substantially independent of the ineffective pressure of the fingers 66$^b$ thereon). The release of the fingers 66$^a$ enables them in turn to perform a doughnut-turning operation in the same general manner,—all doughnuts being advanced one step incidentally to the turning thereof and ultimately delivered, by the continued advance of the respective transverse elements, onto the apron 33, or its equivalent, and thence onto the chute 36,—beneath which any suitable receptacle, or the like, may be placed.

Although I have herein described one complete embodiment of my invention, it should be understood that various features thereof might be independently employed; and also that numerous modifications might be made, by those skilled in the art to which this case relates, without the slightest departure from the spirit and scope of my invention, as the same is indicated above and in the following claims.

I claim as my invention:

1. An organization of the general character described comprising: a vat adapted to contain hot cooking grease; positive mechanical means for advancing floating food units therethrough by laterally engaging the same; and means for supporting said units, above the bottom of said vat, during the time required to heat the same sufficiently to render said units buoyant, said supporting means being endless and driven from said advancing means, although mounted upon rotatable members which are distinct from rotatable members which carry said advancing means.

2. An organization of the general character defined in claim 1 in which said supporting means are provided with lugs and are moved synchronously with said advancing means by engagement of said advancing means with said lugs.

3. An organization of the general character described comprising: a vat adapted to contain hot cooking grease; means for advancing floating food units therethrough; and means, engaging said advancing means, for standing said food units on edge on said advancing means at an intermediate point in the advance thereof and causing the same to fall forward.

4. An organization of the general character described comprising: a vat adapted to contain hot cooking grease; means for advancing floating food units therethrough; and means, engaging said advancing means, for turning said food units at an intermediate point in the advance thereof; said turning means comprising lifting fingers adapted to engage said advancing means.

5. An organization of the general character described comprising: a vat adapted to contain hot cooking grease; means for advancing floating food units therethrough; and means, engaging said advancing means, for turning said food units at an intermediate point in the advance thereof; said turning means comprising lifting fingers extending from a member which is rotated by a friction drive.

In testimony whereof, I have hereunto set my hand at Los Angeles, California, this 21st day of October, 1925.

NEWELL N. SMITH.